(12) United States Patent
Coulet

(10) Patent No.: US 11,176,759 B2
(45) Date of Patent: Nov. 16, 2021

(54) COMPUTER-IMPLEMENTED METHOD OF DISPLAYING A SUBSET OF A DIGITALLY MODELED ASSEMBLY OF OBJECTS

(71) Applicant: Dassault Systemes, Velizy Villacoublay (FR)

(72) Inventor: Pierre Coulet, Tanneron (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 0 days.

(21) Appl. No.: 16/122,220

(22) Filed: Sep. 5, 2018

(65) Prior Publication Data

US 2019/0088031 A1 Mar. 21, 2019

(30) Foreign Application Priority Data

Sep. 20, 2017 (EP) .................................... 17306228

(51) Int. Cl.
*G06T 19/20* (2011.01)
*G06F 3/0484* (2013.01)
(Continued)

(52) U.S. Cl.
CPC .......... *G06T 19/20* (2013.01); *G06F 3/04842* (2013.01); *G06F 3/04847* (2013.01);
(Continued)

(58) Field of Classification Search
CPC ............... G06T 19/20; G06T 15/005; G06T 2219/2016; G06T 2219/2004; G06F 3/04842; G06F 3/04847
See application file for complete search history.

(56) References Cited

U.S. PATENT DOCUMENTS 5,861,889 A * 1/1999 Wallace .............. G06F 3/04845
345/619
7,250,947 B2 7/2007 Piccuezzu et al.
(Continued)

FOREIGN PATENT DOCUMENTS

EP 3 168 813 A1 5/2017

OTHER PUBLICATIONS

Svakhine, N.A., et al., "Illustration and Photography Inspired Visualization of Flows and Volumes," pp. 125-132 (No Date Given).
(Continued)

*Primary Examiner* — Said Broome
(74) *Attorney, Agent, or Firm* — Hamilton, Brook, Smith & Reynolds, P.C.

(57) ABSTRACT

A computer-implemented method of displaying a subset of a digitally modeled assembly (A) of objects (O1, O2, O3), the method comprising the steps of: a) generating and displaying a three-dimensional graphical representation of the assembly in a three-dimensional scene (3DSC); b) using a graphical tool (PT) for selecting one or more objects of said assembly from said three-dimensional graphical representation; c) determining a central point (CP) of the selected object or objects, and computing a distance of each object of the assembly from said central point; and d) modifying the displayed three-dimensional graphical representation of the assembly by hiding objects whose distance from the central point exceeds a threshold, or reducing their visibility. A computer program product, a non-transitory computer-readable data-storage medium and a Computer Aided Design system for carrying out such a method.

13 Claims, 5 Drawing Sheets

(51) Int. Cl.
*G06T 15/00* (2011.01)
*G06T 19/00* (2011.01)

(52) U.S. Cl.
CPC ............ *G06T 15/005* (2013.01); *G06T 19/00* (2013.01); *G06T 2200/24* (2013.01); *G06T 2210/62* (2013.01); *G06T 2219/2016* (2013.01)

(56) References Cited

U.S. PATENT DOCUMENTS

| | | | |
|---|---|---|---|
| 2007/0165924 A1* | 7/2007 | Nicponski | G06T 7/0012 382/128 |
| 2010/0302242 A1 | 12/2010 | Buchanan et al. | |
| 2011/0141109 A1 | 6/2011 | Radet et al. | |
| 2012/0154435 A1* | 6/2012 | Murakami | G09G 5/14 345/629 |

OTHER PUBLICATIONS

Pindat, C. et al. "Drilling into Complex 3D Models with Gimlenses", VRST '13: 19th ACM Symposium on Virtual Reality Software and Technology, Oct. 2013, Singapore, Singapore, pp. 223-230, 2013.
Le Muzic, M., "Visibility Equalizer Cutaway Visualization of Mesoscopic Biological Models," Comput Graph Fomm. Jun. 2016; 35(3): 161-170.
European Search Report for International Application No. EP 17306228, entitled "A Computer-Implemented Method Of Displaying A Subset Of A Digitally Modeled Assembly Of Objects," consisting of 9 pages, dated Nov. 22, 2017.
Jianlong Zhou, et al., "Distance Based 1-14 Enhancement for Focal Region Based Volume Rendering," Informatik Aktuell. (2004).
Viola, I., et al., "Tutorial 4: Illustrative Visualization," Visualization, VIS 05. IEEE, pp. 1-188 (2005).
2.4 Two-Level vol. Rendering, pp. 41-44 (No Date Given).

Viola, I., et al., "Smart Visibility in Visualization," Institute of Computer Graphics and Algorithms, Vienna University of Technology, Austria, pp. 46-62 (No Date Given).
Viola, I., et al., "Importance-Driven Feature Enhancement in Volume Visualization," IEEE Transactions On Visualization And Computer Graphics, pp. 63-74 (No Date Given).
Bruckner, S., et al., "Illustrative Context-Preserving Volume Rendering," EUROGRAPHICS—IEEE VGTC Symposium on Visualization, pp. 75-82 (2005).
Ebert, D., Interactive Volume Illustration for Flow Visualization, Medical and Surgical Training, Electrical & Computer Engineering Purdue University ebertd@purdue.edu, pp. 105-116 (No Date Given).
Senberg, T., et al., "Developer's Guide to Silhouette Algorithms for Polygonal Models," IEEE Computer Graphics and Applications, 23(4):28-37, 2003.
Preim, B., et al., "Smart 3D Visualizations in Clinical Applications," Institute for Simulation and Graphics, Department for Computer Science and Center for Medical Diagnostic Systems and Visualization, pp. 165-175 (No Date Given).
Tietjen, C.,"Combining Silhouettes, Surface, and Volume Rendering for Surgery Education and Planning," EUROGRAPHICS—IEEE VGTC Symposium on Visualization, pp. 176-184 (2005).
Krüüger, A., et al., "Interactive Visualization for Neck-Dissection Planning," EUROGRAPHICS—IEEE VGTC Symposium on Visualization, pp. 185-192 (2005).
Svakhine, N., et al., "Illustration Motifs for Effective Medical Volume Illustration," IEEE, pp. 117-124 (2005).
Preim, B., et al., "Illustrative Visualization for Surgical Planning," Department of Simulation and Graphics Otto-von-Guericke—University of Magdeburg, Germany, pp. 143-156 (No Date Given).
Stredney, D., "Visualization: From Illustrator's Perspective," Visualization, NCI CCC, pp. 133-142 (2005).
Sousa, M. C., "Visualization Tools for the Science Illustrators: Evaluations and Requirements", Department of Computer Science University of Calgary (No Date Given).

* cited by examiner

COMPUTER-IMPLEMENTED METHOD OF DISPLAYING A SUBSET OF A DIGITALLY MODELED ASSEMBLY OF OBJECTS

RELATED APPLICATION

This application claims priority under 35 U.S.C. § 119 or 365 to Europe, Application No. 17306228.2, filed Sep. 20, 2017. The entire teachings of the above application are incorporated herein by reference.

FIELD OF INVENTION

The invention relates to a method of displaying a digitally modeled assembly of objects, and more particularly of displaying a subset of such an assembly. The invention also relates to a computer program product, a non-volatile computer-readable data-storage medium and a Computer Aided Design (CAD) system for carrying out such a method.

The invention applies to the field of computer graphics, and more particularly to the sub-fields of Computer Aided Design (CAD) and Authoring. The invention is particularly suitable for producing technical illustrations, marketing presentations, assembly illustrations, training materials etc.

BACKGROUND

In all the applications above there is a need of representing assemblies of digitally-modeled objects in such a way so as to show parts which are normally hidden inside the assembly. For instance, it may be necessary to provide a representation of a car wherein the engine or other mechanical organs are visible, instead of being concealed by the body of the car.

Document U.S. Pat. No. 7,250,947 discloses a method comprising selecting a region of a three-dimensional graphical representation of the assembly and changing display attributes of objects, or portions thereof, within the selected region. Changing display attributes may in particular include making the "outermost" objects transparent, whereby only objects having a "depth" exceeding a threshold are represented. Otherwise stated, "outer layers" of the assembly are "peeled away", making otherwise hidden parts visible.

The paper by C. Pindat et al. "Drilling into Complex 3D Models with Gimlenses", VRST '13: 19th ACM Symposium on Virtual Reality Software and Technology, October 2013, Singapore, Singapore. pp. 223-230, 2013 discloses a similar method.

This approach is not entirely satisfactory, at least for some applications. Indeed, the user might want to focus on some particular objects of the assembly, but all the other objects situated at a greater "depth" may form a crowded and confusing background.

Document EP 3 168 813 discloses a method wherein a region of a three-dimensional graphical representation of the assembly is selected and, within said region, only objects previously marked as being "revealable" are displayed. As a consequence, "revealable" objects which are normally hidden by "non revealable" ones become visible. Carrying out this method may be cumbersome, as all the objects to be revealed have to be specifically designated as such.

It is also known to manually select objects to be hidden, i.e. whose graphical representation is to be suppressed. This selection may be performed by clicking on the objects in the three-dimensional representation of the assembly, or by selecting the corresponding branches of a corresponding assembly tree. This approach is very flexible and allows e.g. "filtering" the representation of the assembly by only keeping visible some objects of interest while hiding all others. However, its implementation may be very long and cumbersome, requiring a great number of clicks and possibly rotations of the three-dimensional representation of the assembly to make objects accessible.

SUMMARY

The invention aims at overcoming these drawbacks of the prior art. More specifically the invention aims at providing a simple and effective method for "exploring" an assembly—i.e. revealing its internal structure or a part of it—with minimal interventions from the user.

An object of the present invention, allowing achieving the invention, is a computer-implemented method of displaying a subset of a digitally modeled assembly of objects, the method comprising the steps of:

a) generating and displaying a three-dimensional graphical representation of the assembly in a three-dimensional scene;

b) using a graphical tool for selecting one or more objects of said assembly from said three-dimensional graphical representation;

c) determining a central point of the selected object or objects, and computing a distance of each object of the assembly, other than the selected one or ones, from said central point; and d) modifying the displayed three-dimensional graphical representation of the assembly by hiding objects, other than the selected one or ones, whose distance from the central point exceeds a threshold or reducing their visibility.

According to particular embodiments of the invention:

The method may further comprise a step d'), carried out before said step d), of using a graphical control element for inputting a value of said threshold. More particularly, step d') may comprise using said graphical control element for selecting a fraction of an overall number of objects of the assembly to be hidden, and determining the value of said threshold as a function of the selected fraction.

Said steps d') and d) may be carried out iteratively, in a dynamic way.

The second graphical control element may be a slider.

Step c) may comprise computing said distance of each object of the assembly, other than the selected one or ones, from said central point as a maximal distance between the central point and all points of the object.

Said distance may be a Euclidian distance.

Step c) may comprise determining, as said central point, the center of a three dimensional envelope having a predetermined shape and enclosing a minimal volume while fully including the selected object or objects. In particular, said predetermined shape may be spherical.

Step b) may comprise selecting a plurality of objects and step d) may also comprise hiding selected objects whose distance from the central point exceeds the threshold, or reducing their visibility.

Steps b) to d) may be carried out iteratively.

Another object of the invention is a computer program product, stored on a non-volatile computer-readable data-storage medium, comprising computer-executable instructions to cause a computer system to carry out such a method.

Another object of the invention is a non-transitory computer-readable data-storage medium containing computer-executable instructions to cause a computer system to carry out such a method.

Another object of the invention is a computer system comprising a processor coupled to a memory and a graphical user interface, the memory storing computer-executable instructions to cause the computer system to carry out such a method.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

Additional features and advantages of the present invention will become apparent from the subsequent description, taken in conjunction with the accompanying drawings, which show.

DETAILED DESCRIPTION

A description of example embodiments follows.

Hereafter, a "three-dimensional" (or "3D") object will be an object—or a digital model thereof—allowing a three-dimensional (3D) representation. A 3D representation allows the viewing of the part from all angles. For example, a 3D object, when 3D represented, may be handled and turned around any of its axes, or around any axis in the screen on which the representation is displayed.

An "assembly" is constituted by a plurality of objects with predetermined geometrical relationships, e.g. fixed mutual positions.

A "digital model" of an object is a data structure, or a set of data structures, which can be handled by a computer and contains all the information required by the computer to generate a 2D or 3D representation of an object or assembly. The digital model may also contain other items of information, e.g. data representing physical parameters, but they are not required by the present invention.

Figure 1:
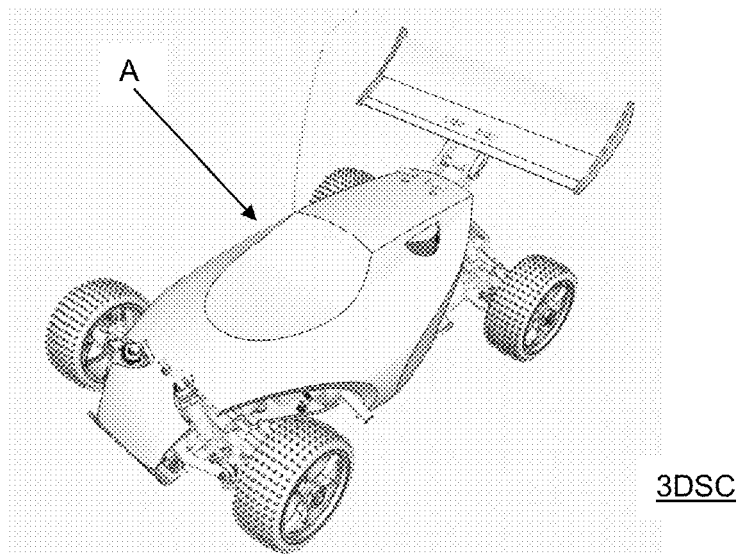
FIG. 1, a three-dimensional graphical representation of a digitally modeled assembly of objects.

FIG. 1 shows a graphical representation, e.g. on a computer screen, of a three-dimensional digitally-modeled assembly of objects A—in this case, a toy car—in a 3D scene 3DSC. Assembly A comprises a plurality of objects, or parts: the car body, wheels, components of the transmission and suspensions, etc. Generating and displaying, e.g. on a computer screen, such a graphical representation constitutes a first step a) of the inventive method.

Figure 2:
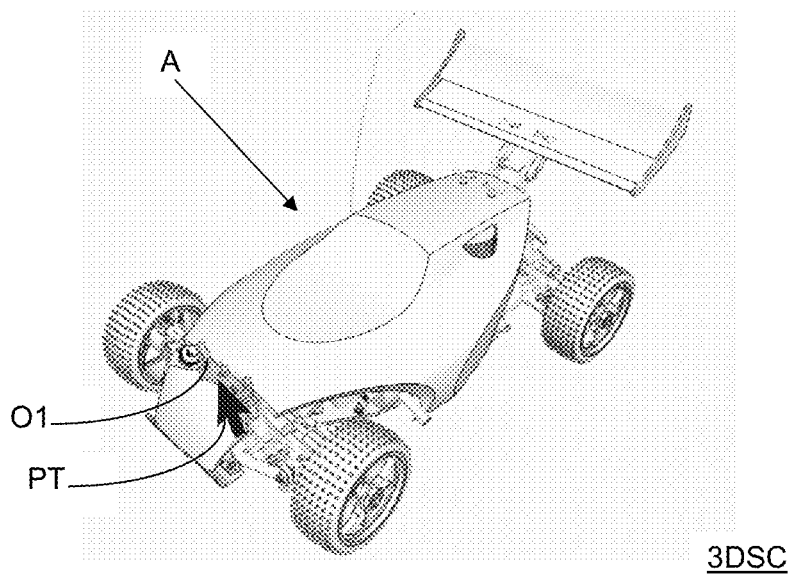
FIG. 2, the selection of an object of said assembly.

As shown on FIG. 2, in a next step b) of the inventive method a particular object O1 of the assembly A, which is at least partially visible on the representation of FIG. 1, is selected. The selection is performed using a graphical selection tool PT which, in the specific embodiment considered here, is a mouse-controlled pointer. Preferably, as shown on the figure, the selected object is highlighted and becomes fully visible even if it was beforehand partially hidden by another object—in this case, the car body.

The following step c) of the method comprises two sub-steps.

First of all, a "central point" CP of the selected object O1 is identified. The central point may be the barycentre of the object (usually determined by assuming constant density), but it is preferably defined as the centre of the smallest sphere containing the whole object. More broadly, it may be defined as the barycentre of an envelope of a predetermined shape (e.g. cubic) scaled to the smallest possible dimension which allows it to contain the whole object. The central point position may be a predetermined attribute of the object or it may be computed on the fly. On FIGS. 3-6 central point CP is identified by a cross; however it does not necessarily have to be actually displayed on the 3D scene.

Then, a distance of each object of the assembly from central point CP is computed. More precisely, a distance is computed between the central point CP and a representative point of each object (other than the selected one). This representative point of a generic object of the assembly may be its central point—e.g. defined as the central point of the selected object O1—but preferably it is the point which is the farthest away from CP. Otherwise stated, in a preferred embodiment of the invention, the "distance of an object" from the central point CP is the maximal distance between CP and any point of the object.

The "distance" computed during the second substep of step c) is preferably the usual "Euclidian" distance of elementary geometry, but it could also be defined in a different way. For instance, a Chebyshev metrics—defined as the greatest distance between two points along any coordinate dimension—may also be used.

Step d) comprises modifying the graphical representation of the assembly by hiding all objects whose distance from the central point CP, computed in step c), exceeds a threshold. Alternatively, instead of being completely hidden, these objects may be made less visible, e.g. by increasing their transparency. It is also possible to assign them a transparency value increasing with distance, in such a way that objects whose distance barely exceeds the threshold remain visible, albeit in an attenuated way.

Figure 3:
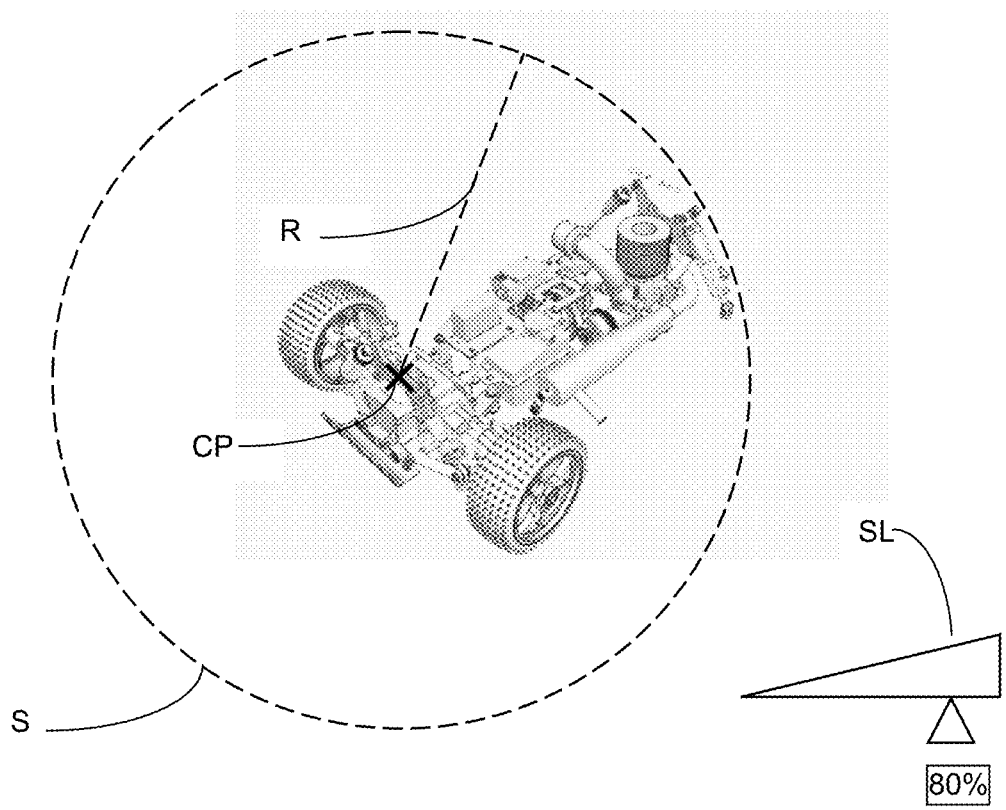
FIGS. 3, 4 and 5, modified graphical representations of the assembly wherein objects which are farthest away from the selected one are hidden, making visible other objects which were previously concealed.

As illustrated on FIG. 3, one may consider that a sphere S is traced, having a radius R equal to the distance threshold and centered on CP. All objects having their representative point outside the sphere are hidden or attenuated. If the representative point of an object is defined as its point which is farthest away from CP, then only objects entirely contained within the sphere S are displayed.

The use of a spherical surface as the boundary between represented and hidden objects is tributary to the choice of the "Euclidian" metrics for computing the distances between the objects and the CP point. More generally, this boundary will be defined by a "iso-distance" surface whose shape depends on the chosen metrics—for instance Chebyshev metrics defines cubic iso-distance surfaces, which may be interesting for some applications.

It is important to understand that spheres or generic iso-distance surfaces do not need to be actually displayed, or even computed. They are only conceptual tools useful to understand the basic principles of the invention.

Advantageously, the inventive method also comprises a step d'), carried out before step d), of inputting the threshold value. In a preferred embodiment of the invention, this step is carried out using a graphical control element (or "widget") such as slider SL of FIGS. 3-6.

In a particularly advantageous embodiment of the invention, also illustrated by FIGS. 3-6, the graphical control element allows a user to select a fraction of the overall number of objects of the to be hidden—or, conversely, not to be hidden. The threshold value is then computed as a function of the selected fraction. Alternatively, the fraction of objects to be hidden—or not to be hidden—or the threshold value, may be directly inputted using e.g. a keyboard.

Figure 4:
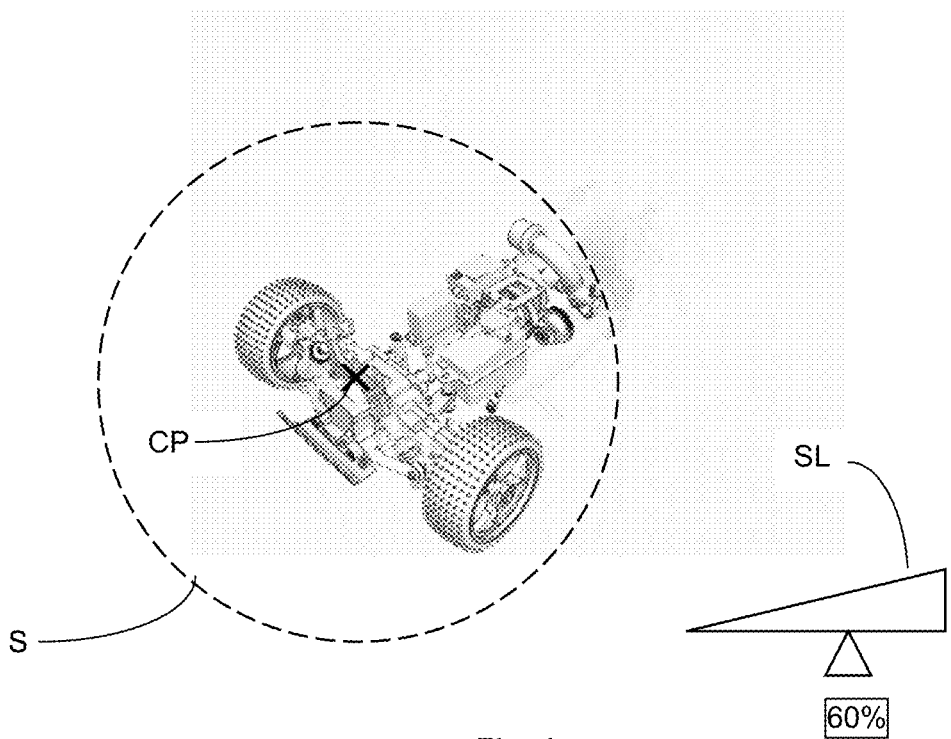
Figure 5:
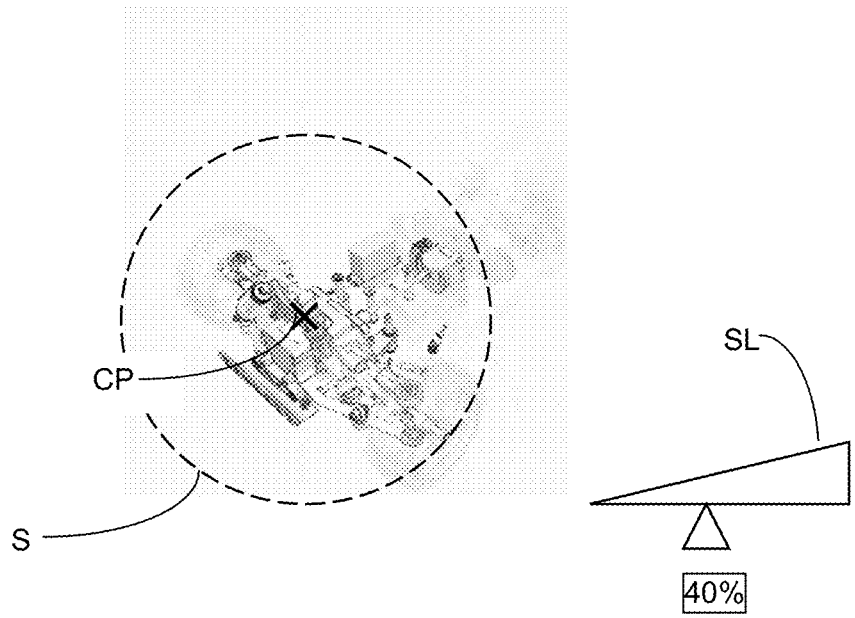

For instance, FIG. 3 shows a situation wherein a cursor is positioned on slider SL at 80% of its length, from left to right. The threshold R is then automatically set at a value such that 80% of the objects of the assembly are contained within sphere S, and therefore 20% of them are hidden from the displayed graphical representation. In the case of FIG. 4, 60% of the objects are contained within the sphere, and 40% are hidden. And in that of FIG. 4, only 40% of the objects are contained within the sphere, and 60% are hidden.

Advantageously, steps d') and d) are carried out in an iterative and dynamic way. Otherwise stated, the user can change at will the value of R by acting on the graphical control element SL, and the representation automatically adjusts in real or near-real time. This allows the user to precisely tweak the size of the "region of interest", centered on the selected object, to be displayed. The user may also "travel" from the outside of the assembly toward the selected object O1, simply by progressively "shrinking" sphere S.

At the beginning of the method, only an object which is at least partially visible from outside the assembly can be selected. This limitation may be overcome by allowing the user to change the selected object at any time during the execution of step d). This way a user interested in visualizing a subset of the assembly surrounding an object which is not initially visible will first select the nearest visible object, progressively reduce the distance threshold (and therefore the size of the displayed subset of the assembly), then de-select the initially selected object and select its real target as soon as it becomes visible. The number of required actions from the user remains very limited.

Figure 6:
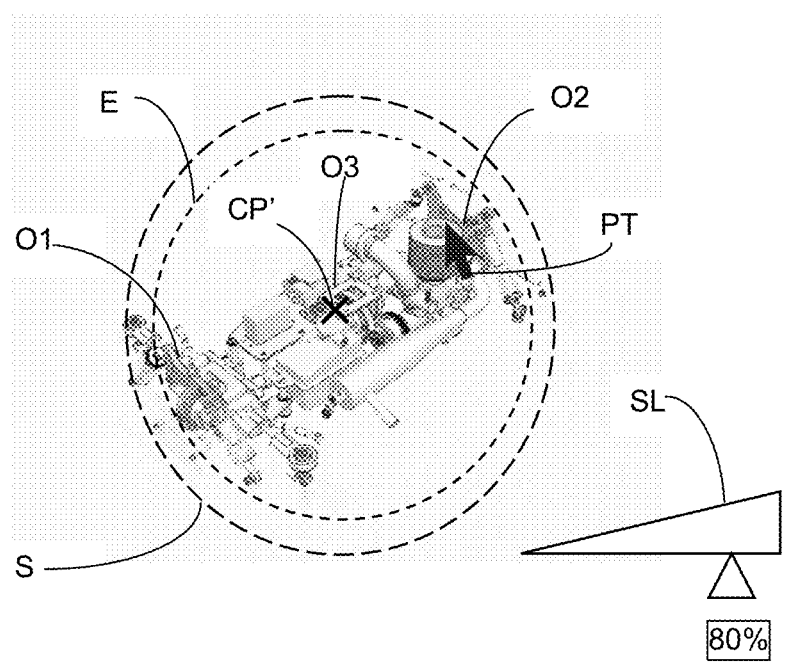
FIGS. 6 and 7, additional modified graphical representations of the assembly wherein a second object is selected and objects which are farthest away from a mid-point between the selected objects are hidden.

Another possibility consists in simultaneously selecting several objects, in which case the central point is situated between them. The two approaches may be combined. For instance, FIG. 6 shows a situation which may be achieved starting from that of FIG. 4 and using pointer PT for selecting a second object O2, which was not visible from the outset, without deselecting O1. The new central point CP' is then defined as the center of the smallest spherical envelope E (or, more generally, iso-distance surface, depending on the chosen metrics) containing both O1 and O2. In the example of FIG. 6, central point CP' falls inside a third object O3 which was not initially accessible.

Figure 7:
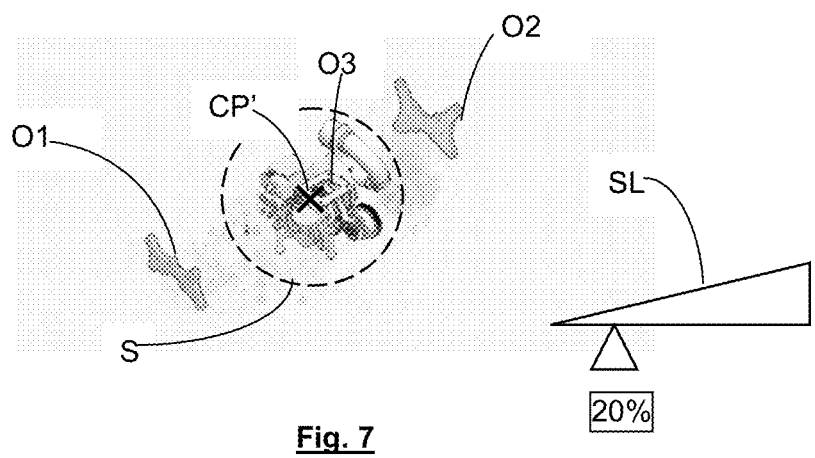

In FIG. 7, the sphere S centered of point CP' has been shrunk so that only 20% of the objects—those immediately surrounding O3—remain visible. It can be appreciated that, according to the invention, obtaining the representation of FIG. 7 starting from that of FIG. 1 requires very few actions from the user: clicking on O1 to select it, acting on the slider SL until O2 is revealed, selecting it by a second click and acting again on the slider. "Digging" through the assembly by removing one object at a time, as in the prior art, would take much longer and require more effort from the user.

It is interesting to note that, on FIG. 7, objects O1 and O2 are displayed even if they are outside the sphere S. This may be useful for helping the user to contextualize the displayed subset of the assembly, but is not essential. Alternatively, they may be hidden, or they visibility may be reduced.

Figure 8:
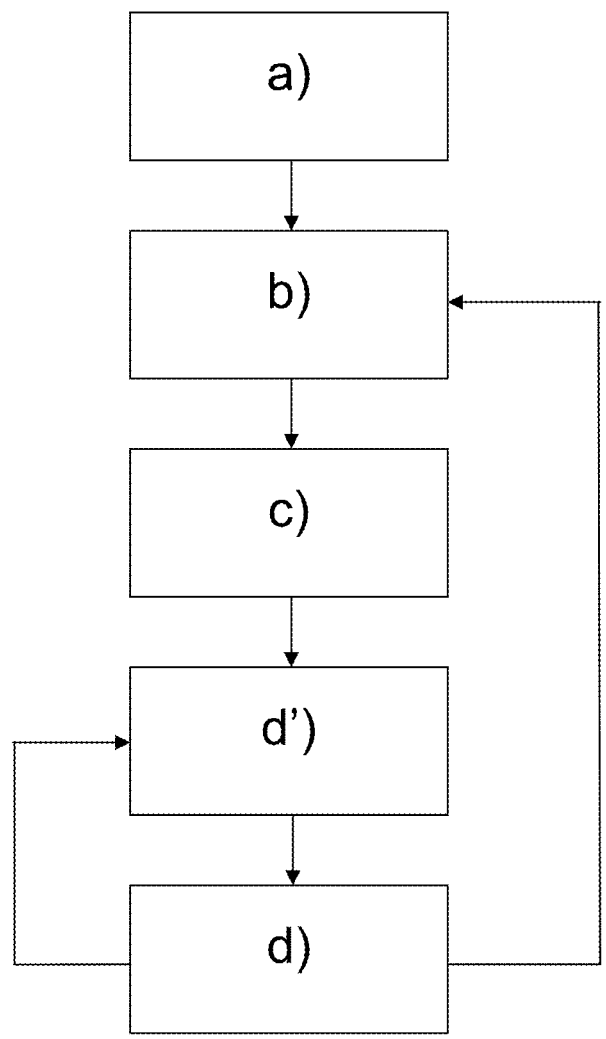
FIG. 8, a flow-chart of a method according to an embodiment of the invention.

FIG. 8 is a flow-chart of the method described above in reference to FIGS. 1 to 7. It is possible to note a first loop, involving steps d') and d), which corresponds to the possibility of dynamically change the distance threshold, and a second loop, involving steps b) to d), representing the possibility of selecting one or more objects during the implementation of the method.

The inventive method can be performed by a suitably-programmed general-purpose computer or computer system, possibly including a computer network, storing a suitable program in non-volatile form on a computer-readable medium such as a hard disk, a solid state disk or a CD-ROM and executing said program using its microprocessor(s) and memory.

Figure 9:
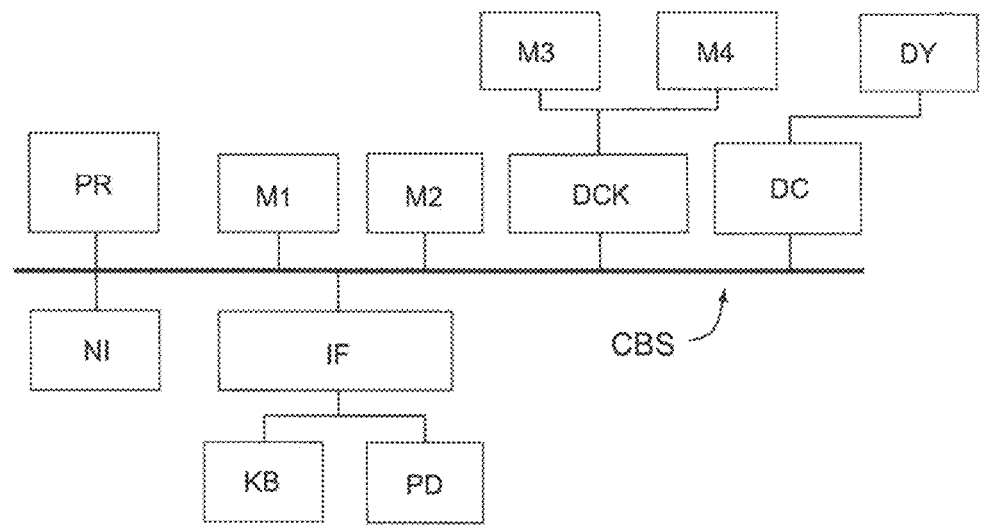
FIGS. 9 and 10, block diagrams of respective computer systems suitable for carrying out a method according to an embodiment of the invention.

A computer—more precisely a Computer Aided Design station—suitable for carrying out a method according to an exemplary embodiment of the present invention is described with reference to FIG. 9. In FIG. 9, the computer includes a Central Processing Unit (CPU) P which performs the processes described above. The process can be stored as an executable program, i.e. a set of computer-readable instructions in memory, such as RAM M1 or ROM M2, or on hard disk drive (HDD) M3, DVD/CD drive M4, or can be stored remotely. Three-dimensional digital models of objects forming an assembly are also stored on one or more of memory devices M1 to M4, or remotely.

The claimed invention is not limited by the form of the computer-readable media on which the computer-readable instructions and/or the digital models of the inventive process are stored. For example, the instructions and databases can be stored on CDs, DVDs, in FLASH memory, RAM, ROM, PROM, EPROM, EEPROM, hard disk or any other information processing device with which the computer aided design station communicates, such as a server or computer. The program and the models can be stored on a same memory device or on different memory devices.

Further, a computer program suitable for carrying out the inventive method can be provided as a utility application, background daemon, or component of an operating system, or combination thereof, executing in conjunction with CPU 800 and an operating system such as Microsoft VISTA, Microsoft Windows 7, UNIX, Solaris, LINUX, Apple MAC-OS and other systems known to those skilled in the art.

CPU P can be a Xenon processor from Intel of America or an Opteron processor from AMD of America, or can be other processor types, such as a Freescale ColdFire, IMX, or ARM processor from Freescale Corporation of America. Alternatively, the CPU can be a processor such as a Core2 Duo from Intel Corporation of America, or can be implemented on an FPGA, ASIC, PLD or using discrete logic circuits, as one of ordinary skill in the art would recognize. Further, the CPU can be implemented as multiple processors cooperatively working to perform the computer-readable instructions of the inventive processes described above.

The computer aided design station in FIG. 9 also includes a network interface NI, such as an Intel Ethernet PRO network interface card from Intel Corporation of America, for interfacing with a network, such as a local area network (LAN), wide area network (WAN), the Internet and the like. The computer aided design station further includes a display controller DC, such as a NVIDIA GeForce GTX graphics adaptor from NVIDIA Corporation of America for interfacing with display DY, such as a Hewlett Packard HPL2445w LCD monitor. A general purpose I/O interface IF interfaces with a keyboard KB and pointing device PD, such as a roller ball, mouse, touchpad and the like. The display, the keyboard and the pointing device, together with the display controller and the I/O interfaces, form a graphical user interface.

Disk controller DKC connects HDD M3 and DVD/CD M4 with communication bus CBS, which can be an ISA, EISA, VESA, PCI, or similar, for interconnecting all of the components of the computer aided design station.

A description of the general features and functionality of the display, keyboard, pointing device, as well as the display controller, disk controller, network interface and I/O interface is omitted herein for brevity as these features are known.

Figure 10:
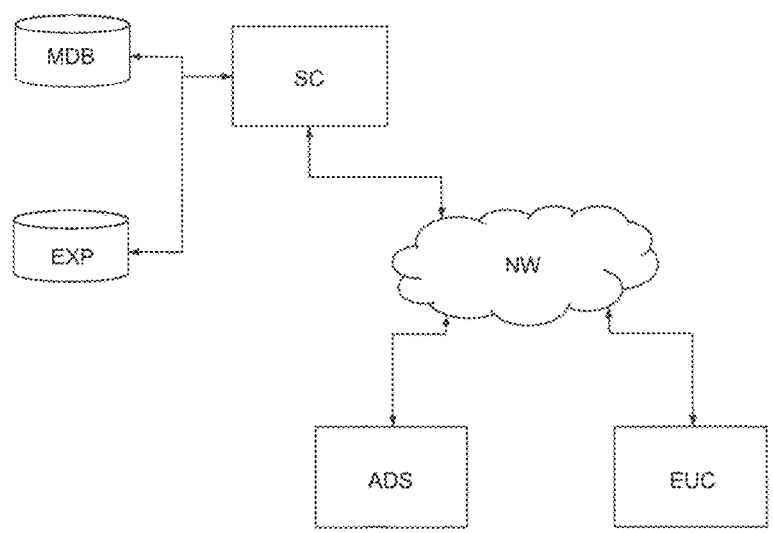

FIG. 10 is a block diagram of a computer system suitable for carrying out a method according to a different exemplary embodiment of the present invention.

In FIG. 10, the executable program EXP and the three-dimensional digital models of the objects are stored on memory devices connected to a server SC. The memory devices and the overall architecture of the server may be the same as discussed above with reference to FIG. 9, except that display controller, display, keyboard and/or pointing device may be missing in the server.

The server SC is then connected to an administrator system ADS and end user computer EUC via a network NW.

The overall architectures of the administrator system and of the end user computer may be the same as discussed above with reference to FIG. 8, except that the memory devices of the administrator system and the end user computer do not store the executable program EXP and/or the three-dimensional digital models. However, the end user computer does store a client program designed for cooperating with the executable program of the server, as it will be discussed below.

As can be appreciated, the network NW can be a public network, such as the Internet, or a private network such as an LAN or WAN network, or any combination thereof and can also include PSTN or ISDN sub-networks. The network NW can also be wired, such as an Ethernet network, or can be wireless such as a cellular network including EDGE, 3G and 4G wireless cellular systems. The wireless network can also be Wi-Fi, Bluetooth, or any other wireless form of communication that is known. Thus, the network NW is merely exemplary and in no way limits the scope of the present advancements.

The client program stored in a memory device of the end user computer and executed by a CPU of the latter accesses, via the network NW, a database MDB stored by the server SC and containing three-dimensional digital models of different objects. This allows an end user to create an assembly of objects to be displayed and explored. It also allows the end user to parameterize a graphical representation of the assembly e.g. by setting a point of view. The server performs the processing as described above, and transmits to the end user computer an image file corresponding to the desired representation of the assembly, again using the network NW.

Although only one administrator system ADS and one end user computer EUC are shown, the system can support any number of administrator systems and/or end user systems without limitation. Similarly, multiple servers, model database can also be implemented in the system without departing from the scope of the present invention Any processes described herein should be understood as representing modules, segments, or portions of code which include one or more executable instructions for implementing specific logical functions or steps in the process, and alternate implementations are included within the scope of the exemplary embodiment of the present invention.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method of displaying a subset of a digitally modeled assembly (A) of objects (O1, O2, O3), the method comprising the steps of:
   a) generating and displaying a three-dimensional graphical representation of the assembly in a three-dimensional scene (3DSC);
   b) using a graphical tool (PT) for selecting one or more objects of said assembly from said three-dimensional graphical representation;
   c) determining a central point (CP, CP') of the selected object or objects, and computing a distance of each object of the assembly, other than the selected one or ones, from said central point;
   d) using a graphical control element (SL) for imputing a value of a threshold (R); and
   e) identifying objects, other than the selected one or ones, whose distance from the central point exceeds the threshold (R), and modifying the displayed three-dimensional graphical representation of the assembly by suppressing their graphical representation or reducing its visibility.

2. The method of claim 1, wherein said step d) comprises using said graphical control element for selecting a fraction of an overall number of objects of the assembly to be suppressed, and determining the value of said threshold as a function of the selected fraction.

3. The method of claim 1, wherein said steps d) and e) are carried out iteratively, in a dynamic way.

4. The method of claim 1, wherein said graphical control element (SL) is a slider.

5. The method of claim 1 wherein step c) comprises computing said distance of each object of the assembly, other than the selected one or ones, from said central point as a maximal distance between the central point and all points of the object.

6. The method of claim 1 wherein said distance is a Euclidian distance.

7. The method of claim 1 wherein step c) comprises determining, as said central point (CP'), the center of a three-dimensional envelope (E) having a predetermined shape and enclosing a minimal volume while fully including the selected object or objects.

8. The method of claim 7 wherein said predetermined shape is spherical.

9. The method of claim 1 wherein step b) comprises selecting a plurality of objects, and step d) also comprises hiding selected objects whose distance from the central point exceeds the threshold (R), or reducing their visibility.

10. The method of claim 1 wherein steps b) to e) are carried out iteratively.

11. A computer program product comprising:
   a non-volatile computer-readable data-storage medium (M1-M4) storing computer-executable instructions;
   the stored computer-executable instructions including instructions that cause a computer system to display a subset of a digitally modeled assembly of objects by:

a) generating and displaying a three-dimensional graphical representation of a digitally modeled assembly of objects in a three-dimensional scene (3DSC);
b) using a graphical tool (PT) for selecting one or more objects of said assembly from said three-dimensional graphical representation;
c) determining a central point (CP, CP') of the selected object or objects, and compute a distance of each object of the assembly, other than the selected one or ones, from said central point;
d) using a graphical control element (SL) for imputing a value of a threshold (R); and
e) identifying objects, other than the selected one or ones, whose distance from the central point exceeds the threshold (R), and modifying the displayed three-dimensional graphical representation of the assembly by suppressing their graphical representation or reduce its visibility.

12. A non-transitory computer-readable data-storage medium (M1-M4) comprising:
a memory area containing computer-executable instructions (EXP);
the computer-executable instructions including instructions causing a computer system to:
a) generate and display a three-dimensional graphical representation of a digitally modeled assembly of objects in a three-dimensional scene (3DSC);
b) use a graphical tool (PT) for selecting one or more objects of said assembly from said three-dimensional graphical representation;
c) determine a central point (CP, CP') of the selected object or objects, and compute a distance of each object of the assembly, other than the selected one or ones, from said central point;
d) use a graphical control element (SL) for imputing a value of a threshold (R); and
e) identify objects, other than the selected one or ones, whose distance from the central point exceeds the threshold (R), and modifying the displayed three-dimensional graphical representation of the assembly by suppressing their graphical representation or reduce its visibility.

13. A computer system comprising:
a processor (P) coupled to a memory (M1-M4) and a graphical user interface (KB, PD, DC, DY);
the memory storing computer-executable instructions (EXP) that cause the computer system to display a subset of a digitally modeled assembly of objects by:
a) generating and displaying a three-dimensional graphical representation of the assembly in a three-dimensional scene (3DSC);
b) using a graphical tool (PT) for selecting one or more objects of said assembly from said three-dimensional graphical representation;
c) determining a central point (CP, CP') of the selected object or objects, and computing a distance of each object of the assembly, other than the selected one or ones, from said central point;
d) using a graphical control element (SL) for imputing a value of a threshold (R); and
e) identify objects, other than the selected one or ones, whose distance from the central point exceeds the threshold (R), and modifying the displayed three-dimensional graphical representation of the assembly by suppressing their graphical representation or reducing its visibility.

\* \* \* \* \*